(12) United States Patent
Herberger et al.

(10) Patent No.: US 7,764,956 B2
(45) Date of Patent: Jul. 27, 2010

(54) SYSTEM AND METHOD FOR CREATION OF PERSONALIZED APPLICATIONS FOR MOBILE DEVICES

(75) Inventors: Tilman Herberger, Dresden (DE); Titus Tost, Dresden (DE)

(73) Assignee: MAGIX, AG (DE)

( * ) Notice: Subject to any disclaimer, the term of this patent is extended or adjusted under 35 U.S.C. 154(b) by 679 days.

(21) Appl. No.: 11/674,798

(22) Filed: Feb. 14, 2007

(65) Prior Publication Data

US 2008/0195997 A1 Aug. 14, 2008

(51) Int. Cl.
*G06F 9/44* (2006.01)
(52) U.S. Cl. .................................... 455/418; 455/414.1
(58) Field of Classification Search ................. 455/418, 455/403, 410, 414.1, 414.3
See application file for complete search history.

(56) References Cited

U.S. PATENT DOCUMENTS

| | | | |
|---|---|---|---|
| 5,680,533 A | 10/1997 | Yamato et al. | |
| 5,680,534 A | 10/1997 | Yamato et al. | |
| 5,941,774 A | 8/1999 | Takemoto et al. | |

(Continued)

OTHER PUBLICATIONS

Internet Document Published by Austin Community College, for Its "Video Game Development", ACC Continuing Education Course Schedule, Oct. 25, 2005, Published in: US.

(Continued)

*Primary Examiner*—Sam Bhattacharya
(74) *Attorney, Agent, or Firm*—Fellers, Snider, Blankenship, Bailey & Tippens, P.C.; Terry L. Watt

(57) ABSTRACT

There is provided a system and method for the creation of customized applications for mobile computing devices which will allow a user to incorporate selected media items into a preexisting program, thereby customizing it for execution on his or her own brand and model of device (e.g., cell phone). In one preferred embodiment, the media items will be resident on the user's phone and will be selected and transmitted to a remote computer for assembly into a customized application. The customized application will then be transmitted back to the user's phone for execution and viewing/hearing of the embedded media items. In another preferred embodiment, the media items will be resident on a remote computer where they will be selected by the user for incorporation into the customized program. The resulting program will then be transmitted to the user's designated device for execution.

9 Claims, 8 Drawing Sheets

U.S. PATENT DOCUMENTS

| | | |
|---|---|---|
| 5,984,780 A | 11/1999 | Takemoto et al. |
| 6,115,036 A | 9/2000 | Yamato et al. |
| 6,167,562 A | 12/2000 | Kaneko |
| 6,848,996 B2 | 2/2005 | Hecht et al. |
| 6,894,686 B2 | 5/2005 | Stamper et al. |
| 2002/0082082 A1 | 6/2002 | Stamper et al. |
| 2002/0183051 A1 | 12/2002 | Poor et al. |
| 2003/0149958 A1 | 8/2003 | Baluja et al. |
| 2003/0179233 A1 | 9/2003 | McWalter et al. |
| 2003/0181196 A1 | 9/2003 | Davidov et al. |
| 2004/0034853 A1 | 2/2004 | Gibbons et al. |
| 2004/0078383 A1* | 4/2004 | Mercer et al. ............... 707/102 |
| 2004/0157593 A1 | 8/2004 | Lee et al. |
| 2005/0108690 A1 | 5/2005 | Lau et al. |
| 2005/0108691 A1 | 5/2005 | Lau et al. |
| 2005/0108692 A1 | 5/2005 | Lau et al. |
| 2005/0227761 A1 | 10/2005 | Yoshino et al. |
| 2005/0287852 A1* | 12/2005 | Sugawara et al. ............ 439/135 |
| 2006/0010453 A1* | 1/2006 | Illowsky et al. ............. 719/318 |
| 2007/0211683 A1* | 9/2007 | Shaheen et al. ............. 370/338 |
| 2007/0282848 A1* | 12/2007 | Kiilerich et al. ............... 707/10 |
| 2008/0052349 A1* | 2/2008 | Lin ........................... 709/203 |

OTHER PUBLICATIONS

Internet Document Related to Multiplatform Software, "Joe Cool's v710 Java Game/App Editor v1.0.0.0", Oct. 25, 2005, Published in: US.

Internet Document Related to Tools—"vNES-Nitendo [sic] Emulator for J2ME 1.4" by VAMPNET, Oct. 25, 2005, Published in: US.

* cited by examiner

SYSTEM AND METHOD FOR CREATION OF PERSONALIZED APPLICATIONS FOR MOBILE DEVICES

FIELD OF THE INVENTION

The present invention relates generally to the field of software application development for mobile devices. More particularly, but not by way of limitation, the present invention relates to systems and methods for creating personalized applications, wherein the applications are automatically adapted to the technical requirements of a target mobile device and wherein the personalization comprises the addition of personal media files from a user.

BACKGROUND OF THE INVENTION

The cell phone and other mobile devices have become a fixture in the homes and the offices of most U.S. and many foreign consumers. As might be expected, the pursuit of consumers in this growing market has driven the providers of cellular telephones and other mobile devices to offer a continuing profusion of new products and features that are designed to differentiate each company's product from the others and to entice the consumer to buy a particular brand of hardware. Market dynamics have resulted in a steady evolution of cell phones from single purpose communication devices into multimedia hubs that enable the user to capture video sequences, take pictures, listen to radio, play games, view and hear multimedia files, etc. In addition to the near universal explosion of multimedia functionality most modern cell phones and mobile devices allow the user to run a variety of software applications on those devices. The range of available applications varies from email-management and word processing programs to game programs. Of course, the quality and functionality of the software that is available for mobile devices has increased with each successive hardware generation. This has been fuelled at least in part by the steady increase in processing power of the CPUs of these devices. This has led to an increased demand for software to run on these devices. Further the increasing interdependence between mobile phone and desktop PC (e.g., a user's main phone book may be maintained on a desktop PC but it will most often actually be needed while the user is trying to complete a call away from his or her desk) argues for even better integration between the phone and PC-based software. Of course, recent technological advances have made it possible for cell phone users to connect to and browse the Internet and, in some cases, to replicate many of the functions that a desktop PC Internet user is accustomed to having at his or her disposal.

Of course, the present stage of cell phone evolution did not come about over night. Rather there has been a continuous series of changes in cell phone features and capabilities as such phones evolved from the unwieldy bag phone of yesterday to today's modern compact phones that are not much larger than a candy bar. The trend toward smaller phone size, however, has been slowed somewhat by the decision to include features beyond basic telephony in many cell phones (e.g., cameras, PDA functionality, GPS mapping, etc.) and, similarly, by the perceived need to include ever increasing levels of multimedia functionality including both recordation and playback.

In addition, there has also been a similar trend toward increasing the amount of customization that users can apply to their phones and mobile devices. Early examples of user customization include after market cell phone case parts and bags. Today, however, the customization trend has taken a more technological turn and companies are increasingly allowing users to modify the cell phone operating system by, for example, selecting a background wallpaper for the LCD display, choosing a boot screen, assigning photo caller I.D.s, (using images that might be created by a cell phone digital camera), selecting custom ring tones, etc.

The different forms of phone customization can be broadly divided into two categories: a hardware customization approach and a software customization approach. The hardware customization approach, although still a viable part of the revenue streams for many cell phone manufacturers, does not appear to be drawing the level of consumer attention that it once did. On the other hand, customization through software has given rise to a whole new industry which is focused on providing application programs and digital content suitable for use on mobile devices. Numerous companies have been founded which entirely base their economic foundation on the provision of customized ringtones, system menus, and themes for mobile devices.

Of particular interest for purposes of the instant disclosure are the many programs and games that have been developed for users of mobile devices. In many cases, customers can choose remotely stored programs or games and then have those items delivered to their devices via the phone system.

In a typical scenario, a customer learns of a cell phone-based game or other program. He or she will then request that this program be transferred to his or her cell phone for execution there. However, unless care is taken it is possible that the purchased software program or game will not run on that user's device. One reason for this is that there are a very large number of phones with different capabilities on the market and a correspondingly large number of software developers. Although the Java™ application creation environment has emerged as a defacto programming standard, the manufacturer's implementation on each cell phone is potentially different. Thus a user is never really certain whether a piece of software will perform properly on his or her cell phone until it is actually installed.

A variety of different approaches to the problem of creating applications that run on multiple mobile communications devices have been utilized with varying degrees of success. As an example, there are software development environments that are designed to allow the professional programmer to create programs or games within an environment that allows the completion of the software program or game simultaneously onto mobile devices that support different application execution environments. All of these approaches however are directed to professional game/program creation for mobile devices, wherein the creation process in itself is still very complicated and too difficult for the ordinary user.

As a consequence, these various trends have tended to make it impossible for most users to create or modify in any significant way programs that execute on their mobile devises. This of course means that a user is, for all practical purposes, strictly limited to the program offerings provided by third parties and, further, limited to the choices provided for the user's mobile device. The possibility of a user creating cell phone-based programs and games is not an option for the average user since the steps and activities necessary to do this are only practicable for a person with sufficient knowledge in specific programming languages and who have the necessary software tools. Thus, whether or not a new program or game can be transferred onto a given user's mobile device is more or less externally determined. In addition the user typically has only a limited opportunity to customize programs or games and no ability to create them.

Thus what is needed is a method that makes it possible for a user of a modern cell phone or other mobile devices to create customized software programs or games, wherein the user can integrate his or her own multimedia data into the resulting application. Additionally the resulting program or game will preferably be created according to the specific technological requirements of the user's particular mobile device. Further and preferably, the method will be implemented on two platforms: a desktop (or laptop, etc.) computer and a mobile device. As is described in greater detail below, in a preferred embodiment the user will initiate the process of creating customized/personalized programs either on the computer or directly on the mobile device. Further, and preferably, the user will begin by selecting a program/game template and one or more multimedia files that he or she wants to integrate into the selected program. Finally, a method is needed that will allow the user to select a target mobile device and the method will automatically create the personalized game or program and subsequently transfer the game or program to the target mobile device.

Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for the creation of applications for mobile devices which will allow a user to incorporate selected media items into a preexisting program, thereby customizing it for execution on his or her own brand and model of device (e.g., cell phone). In one preferred embodiment, the media items will be resident on the user's phone and will be selected and transmitted to a remote computer for assembly into a customized application. The customized application will then be transmitted back to the user's phone for execution and viewing/hearing of the embedded media items. In another preferred embodiment, the media items will be resident on a remote computer where they will be selected by the user for incorporation into the customized program. The resulting program will then be transmitted to the user's designated device for execution.

In one preferred embodiment the user will be able to add personalization to programs (including games) for execution on his or her own brand and model of mobile device without any need for technical knowledge about its hardware or operating system specifics. The instant system and method is primarily intended for use by cell phone owners and is generally directed to cell phones which feature support for various multimedia features. That being said, other mobile hardware platforms could benefit from the invention disclosed herein.

In brief, the instant invention enables a user to create personalized games or other phone-resident programs which are specifically adapted to execute on that user's mobile device. In more particular, according to a first preferred embodiment the instant invention allows the user to create customized games or other programs which are customized by including multimedia data files that have been provided by that user.

According to a preferred embodiment a user will be able to select one or more video files, image files, and/or audio files (including voice, music, etc.) that are resident on his or her cell phone that are to be used in customizing a user-selected software application that will subsequently execute on the user's cell phone. The personalized program will preferably be created via a multi-step process wherein the user will be given an opportunity to select the type of program (e.g., game, calendar, contact, etc.) as well as the media files that are to be used. Additionally, the program that is created will preferably be specifically adapted to utilize the particular hardware and operating system of the requesting user's cell phone or other mobile device.

According to a first preferred embodiment, the instant game/program creation process will preferably be reduced to a series of steps wherein the user begins by selecting a program type from a predetermined list of program types (e.g., a type of game, a calendar program, a slide show, etc.). As a next preferred step, the user will select media that is stored within his or her cell phone for incorporation into the selected program type. The media might be digital files that contain still images (e.g., jpg/JPEG, gif, etc. files), videos (e.g., .mpg/MPEG files), audio, (e.g., MP3 files, MIDI files, ring tones, music files, etc.), etc. This information (e.g., the program type and the digital media) together with the type (preferably including the specific model designation) of the mobile communications device from which the media items were obtained is then transmitted to a remote server where the process of integrating the selected media items into the selected program is carried out independent of the user's intervention. In another preferred embodiment initial steps of the preferred process will be carried out entirely on a personal computer. That is, the steps of selecting a program type, device type, and one or more media files will be done at the user's computer. Then, after it has been assembled according to the user's preferences, the resulting program will be transferred to the specified mobile communications device.

With respect to the program that executes on the user's computer the process of assembling the requested program and integrating the user's media files will include creating a program that will be optimized or otherwise designed to run on the mobile device hardware from which the request originated or for a device specified by the user. Preferably, the types of mobile communications devices that are supported by the instant method will be updated from time to time as new models are announced and/or introduced into the marketplace.

Turning now to a more detailed discussion of the invention disclosed herein, according to a preferred embodiment the instant invention begins with the installation of programs on both a personal computer and the user's mobile communications device. As will be explained in greater detail below and according to a first preferred embodiment, the instant invention can best be described as a process which is executed on two different hardware platforms. The first platform is a PC or other computer wherein some of the principal steps in the instant invention will be carried out. The second platform is the mobile device from which the program/game will typically be requested and for which the program/game will be created. In both cases, customized software to implement the instant invention will be resident on each platform. The preferred functionality of each will be discussed below.

According to a next preferred step, the user will utilize his or her cell phone (and the software resident therein) to select a program/game template and digital information contained within the cell phone or other mobile communications device. In one preferred embodiment, the user will select a type of program after which he or she will be prompted to select the appropriate (e.g., compatible) multimedia or other digital content. In other variations, the user will first select a digital data type (e.g., one or more static images, a video clip, an MP3 file, a MIDI file, etc.) and the instant invention will supply a list of program templates that are compatible with this choice.

In a preferred embodiment the selection of digital graphic and/or sound files will be continued until the requirements of the program/game template (or templates) are met. The game/program templates will preferably be designed to allow the incorporation of the user-selected digital content therein. For example, a template for a jigsaw puzzle type game for a mobile device will incorporate, for example, selected digital photos into a game, e.g., a digital image provided by the user will be "cut" into pieces in much the same manner as would be found in a conventional jigsaw puzzle, the object of this game being to reassemble the pieces into a single image. Clearly, the nature of the program template will determine the sort of digital file (and its usage) that would be suitable for integration therein. The sorts of digital information that could possibly be utilized are limited only by the imagination of the program designer, but it would normally be expected that, depending on the template, it might be possible for the user to add photo, video and audio files into one template, whereas another template might only accept audio material.

In the case that media file selection and application assembly steps are both carried out entirely on a personal computer, the user will preferably next select the type (e.g., brand and model) of mobile device which is to host the resulting personalized game/program. To assist the user in specifying the target mobile device, the user will preferably be provided with a list (e.g., via a menu, etc.) from which he or she will select the desired target device. This list will preferably be updated automatically via the Internet (e.g., to provide support for new models as they are introduced) or alternatively it will be updated at any time if the user so desires.

Associated with the list of target mobile devices will preferably be a description of the technical features/specifications of each such device, preferably stored in a database. The sorts of information that might be kept includes the format settings for photo, video and audio material of each particular mobile device. Additionally, the instant invention will preferably store the information about the application execution environment that is supported on that mobile device (e.g., display screen resolution, operating system, processor speed and available memory, etc.). In the event that the application creation request is initiated from a mobile device, the user will preferably not need to specify the type of the mobile device, because a preferred embodiment of the instant invention will include data that describes the type of the mobile device (e.g., an indication of the device brand, model designation, operating system revision number, etc.) along with the transmission of the user-selected desired template and media files.

After the target mobile device has been selected, the instant invention will preferably read the format settings for the selected target mobile device from the above-described database. These settings will preferably include a description of the technical features/specifications of the target mobile device, wherein the technical features are preferably organized into support for specific audio, video and photo settings. The instant invention will preferably gather data about each selected digital file, wherein the sorts of information contemplated at this step includes information such as bit rates, sample rate, video codec, file types, file sizes, etc.

Further, this same information will preferably also be determined about the device on which the resulting program will be executed, i.e., the file types, file sizes and bit rates, etc., available on that target mobile device. This information will preferably be stored at the outset, but it is also possible that the information might be stored as a part of the resulting program/game to allow the user to change the specifics of that game/program at a later time.

As a next preferred step, the instant invention will gather information related to the technical details of the multimedia material that has been selected by the user of the instant invention. For example, this sort of data might include information such as the bit rate, resolution, file size and file type of each selected digital media file. Comparable to the processing of the gathered data with information about the technical features of the target mobile device, the gathered information about the technical details of the selected multimedia material is stored at run time of the instant invention, however it is also possible that the information might be stored permanently as part of (or in connection with) the created program/game to allow the user to change specifics of the created game/program at a later date.

As a next preferred step, the instant invention will preferably initiate the process of creating the personalized game/program for the defined target mobile device according to the selected game/program template. This step of the instant invention is preferably carried out automatically without further interaction required by the user. The instant invention preferably utilizes the gathered information of the selected game/program template, the selected multimedia material and the target mobile device and creates a game/program for further approval by the user. The selected multimedia material is converted to meet the requirements of the target mobile device and integrated into the game/program template. After the selected multimedia material is converted to match the requirements/limitations of the target mobile device, the instant invention ports the program/game according to the requirements of the target mobile device regarding the application execution environment thereby creating the desired program/game according to the selection of the specific template by the user.

After the game/program creation process has been initiated and completed on a personal computer, the user will preferably be presented with the completed game/program which the user will have the option of testing to determine its quality as it appears on the personal computer, however if the user initiated the creation process from the mobile device the instant invention skips that test step of the instant invention and transfers the created game/program to the mobile device. The instant invention will preferably provide an emulation mode wherein the target mobile device is emulated on the PC and the user will be able to initiate the same commands on the personal computer as on the mobile device, thereby making sure that the program/game meets the quality requirements of the user. If the user is satisfied with the program, the instant invention will automatically transfer the game/program to the target mobile device so that the user can enjoy the personalized game/program on his or her mobile device. If the user is not satisfied with the result of the creation process or if he or she wants to modify the selected multimedia material or if he or she wants to change any detail of the created program it will preferably be possible to go back to the definition process to modify specific settings. This process can be repeated until the user is satisfied with the created program/game.

The instant method of creating personalized applications for mobile devices is a process which moves the popular customization approach of the visual parts of operating systems on mobile devices to the creation of applications for mobile devices and which additionally relieves the user from the requirement of dealing with different technicalities regarding the supported application execution environment on a target mobile device. Additionally the creation process completely relieves the user from any knowledge about specific technical requirements and support for specific technical features on mobile devices and allows the user to create specific personalized games/programs for their mobile devices in a matter of minutes, wherein the created games/programs feature audio, video or photo material from that user.

Further, via the instant approach the user is provided with a method of quickly generating games/programs for mobile devices which incorporate personal multimedia material into the generated games/programs either directly after creating a plurality of media files with his or her mobile device or at a later time initiated from a personal computer. Further, the instant method allows a user to complete the process in a couple of minutes without requiring any detailed knowledge of the specific technical details that are normally needed for the creation of applications for mobile devices.

In summary, it should be clear that an approach such as this would be a tremendous aid to the user of a modern mobile device and would additionally mean a tremendous development for the modem mobile devices and their customization options. With the instant invention users of modem mobile devices will be able to create customized personalized software programs/games for any number of different mobile devices in a short time without the requirement of specific knowledge about technical features of mobile devices. Additionally, because in a preferred embodiment the templates and the supported mobile devices list of the instant invention is intended to be modifiable, the instant system will continue to be relevant in the future. Each step of the instant invention is carried out with a minimum of required user input and the creation process of the desired program/game is carried out automatically with an automatic transfer of the created program/game to the target mobile device.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention. Further objects, features and advantages of the present invention will be apparent upon examining the accompanying drawings and upon reading the following description of the preferred embodiments.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENTS

Figure 1:
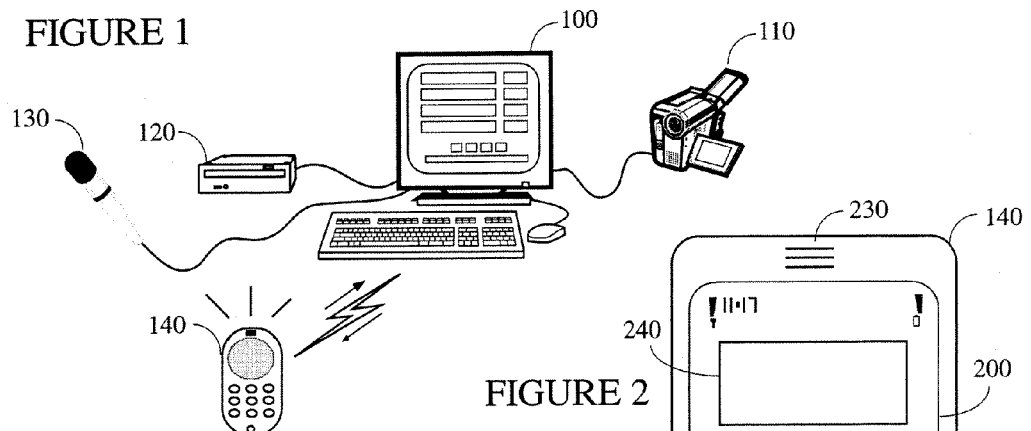
FIG. 1 illustrates an environment of the instant invention.

Referring now to the drawings, wherein like reference numerals indicate the same parts throughout the several views, there is provided a preferred system and method for creating personalized applications for mobile devices without requiring the user to have knowledge concerning the technical requirements for creating applications for mobile devices. The instant invention preferably provides the user with a very easy and fast way to create specific customized applications for each supported mobile device.

By way of general explanation and in accord with the preferred embodiment, it is to be understood that when the phrase "creating personalized applications for mobile devices" is used herein that usage will preferably be interpreted as meaning providing the user of the instant invention with an easy and flexible way of creating customized personalized applications. The instant invention allows the user to create personalized applications with a minimum amount of effort, leaving the creative steps of the creation process completely in the hands of the user and having the technical steps and requirements handled automatically by the instant invention. A computer program that implements the instant invention will preferably be located on a users computer, wherein the bulk of the steps that might be required to create the customized application takes place. In another preferred embodiment the computer program will be a part of the mobile device and the mobile device will act as the initiating device for the instant invention. Preferably, after the personalized application is created it will be automatically transferred to the mobile device of the user. The transfer will preferably be carried out using the transfer options available to each respective mobile device. The instant invention will preferably guide the user through each step of the creation process, thereby simplifying the creation process for the user in general and additionally relieving the user of the requirement to know specific technical details.

For purposes of the instant embodiment it should be understood that the invention preferably seeks to enable a user to quickly and easily create customized, personalized applications for a desired mobile device either initiated directly from the mobile device or initiated from a users computer. The step-wise process will preferably be initiated by the user in one of two different ways. In a first embodiment the instant invention will be initiated by selecting from among one or more application templates that are supplied to the user. These application templates will preferably feature a short description of the type of application corresponding to each template and could potentially include a short introduction video (or several still images) that illustrate how the selected application will likely appear after it has been assembled according to the instant invention.

In a second variation the user will initiate the application creation process by selecting a media file that is to be incorporated into an application. In this scenario, the instant invention will preferably automatically filter the list of available application templates to display these templates which are compatible with the selected media file. Clearly, the type of media file that has been selected could, in some cases, determine the application template(s) that are presented to the user. For example, static digital images would work best with a puzzle- or screen saver-type of application.

Further, in the preferred embodiment the instant invention will monitor the digital content that has been selected and ensure that the user is prompted to provide the template that has been selected (or is subsequently displayed) with all of the media files that it requires. After determining that all of the required media items have been specified, the instant invention will preferably automatically create the customized application and transfer it to the desired mobile device of the user.

However, before creating the customized application according to the user's specification the instant invention will preferably assemble information about the selected media files and the target mobile device, information that describes the technical details of the media files, the technical capabilities of the target mobile device, the application environment of the target mobile device, etc.

As a next preferred step, the instant invention will convert the media files into a format that matches the technical capabilities of the target mobile device and thereafter create the personalized application according to the information about the application environment. Some preferred workflows and additional specifications regarding the instant invention will be described in more detail below.

As is generally indicated in FIG. 1, at least a portion of the instant invention will be implemented in form of software running on a user's computer 100. Such a computer will have some amount of program memory and hard disk storage (whether internal or accessible via a network) as is conventionally utilized by such units.

Additionally it is possible that an external camera 110 of some sort will be utilized in connection with—and will preferably be connectible to—the computer so that video, audio and/or graphic information can be transferred to and from the computer (FIG. 1). Preferably the camera 110 will be a digital video camera, although that is not a requirement, as it is contemplated that the user might wish to utilize still images from a digital still camera in the creation of his or her customized application. Further, given the modern trend towards incorporation of cameras into other electronic components (e.g. in handheld computers, cell phones, laptops, etc.) those of ordinary skill in the art will recognize that the camera might be integrated into the computer or some other electronic device and, thus, might not be a traditional single-purpose video or still camera. Although the camera will preferably be digital in nature, any sort of camera might be used, provided that the proper interfacing between it and the computer is utilized. Additionally, a microphone 130 might be utilized so that the user can add voice-over narration and a CD or DVD burner 120 could be useful for read and/or storing in-progress or completed works. Additionally to that the instant invention features the utilization of a modern cell phone 140 which will be connected to the computer by means of any possible connection/transmission method, like Bluetooth, infrared or via a data cable, thereby allowing the user to transfer information to and from the cell phone.

Figure 2:
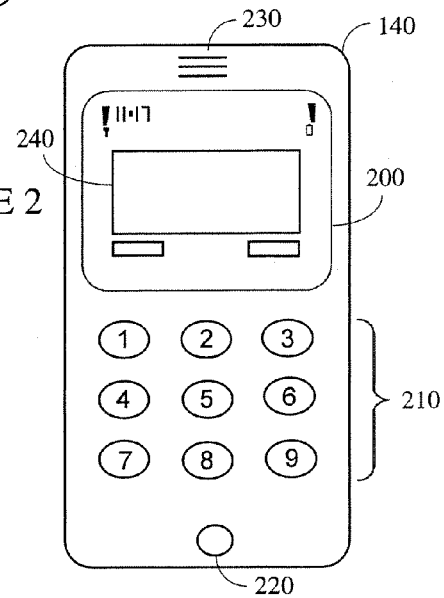
FIG. 2 contains an illustration of a preferred mobile communications device suitable for use according to the instant invention.

Now turning to FIG. 2, which illustrates a second hardware platform on which some aspects of the instant invention will be implemented. As is generally indicated in FIG. 2 a part of the instant invention will be carried out on a users cell phone 140. Such a cell phone will preferably have some amount of internal program memory and data storage (e.g. computer RAM) of the sort that is normally supplied with such units. Additionally it is anticipated that the cell phone will utilize a speaker 230 and a microphone 220. According to a preferred embodiment, and as is generally indicated in FIG. 2, a cell phone suitable for use with the instant invention will preferably contain software resident therein with menu choices 240 which will be presented to the user via the cell phone display 200. As indicated in FIG. 2, in a preferred arrangement a user will interact with the instant invention by way of the a graphical user interface that is presented via display 200 of the cell phone and additionally with the use of the standard telephone keypad 210, or alternatively, the various special function keys that are often provided with the cell phone 140 could also be used for the same purpose. Finally, many cell phones and other devices utilize "soft keys" which are graphical representations of buttons that are drawn on the display device 200 and which could also be used to receive instructions from a user. Those of ordinary skill in the art will recognize that interaction with the user could also be carried out by use of different methods and/or devices (to include the use of peripherals that have been attached to the cell phone) and are not limited to the use of physical buttons that might be present on the face of the selected device.

Figure 3:
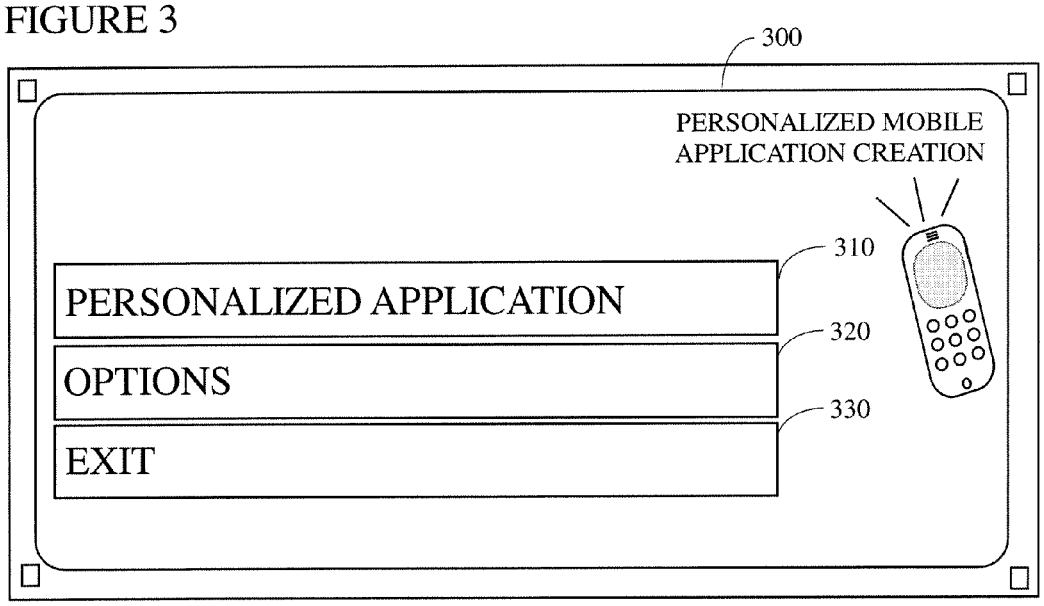
FIG. 3 depicts a first aspect of a preferred graphical user interface of the instant invention.

Turning next to FIG. 3, in a preferred arrangement of the instant invention a user will be presented with a graphical user interface 300 after initializing the program on a personal computer or on the users mobile device. The user will preferably be provided with at least three menu options, wherein each menu option allows the user to initiate specific functions of the instant invention. In one preferred embodiment, the user will have the option of starting the process of creating a personalized application for a mobile device 310, defining various operational parameters 320, and exiting the program of the instant invention 330 and to end this aspect of the instant inventive process. Selection of the "personalized application" option starts the process constructing such an application. The specifics of the options will be described below in connection with another figure.

Figure 4:
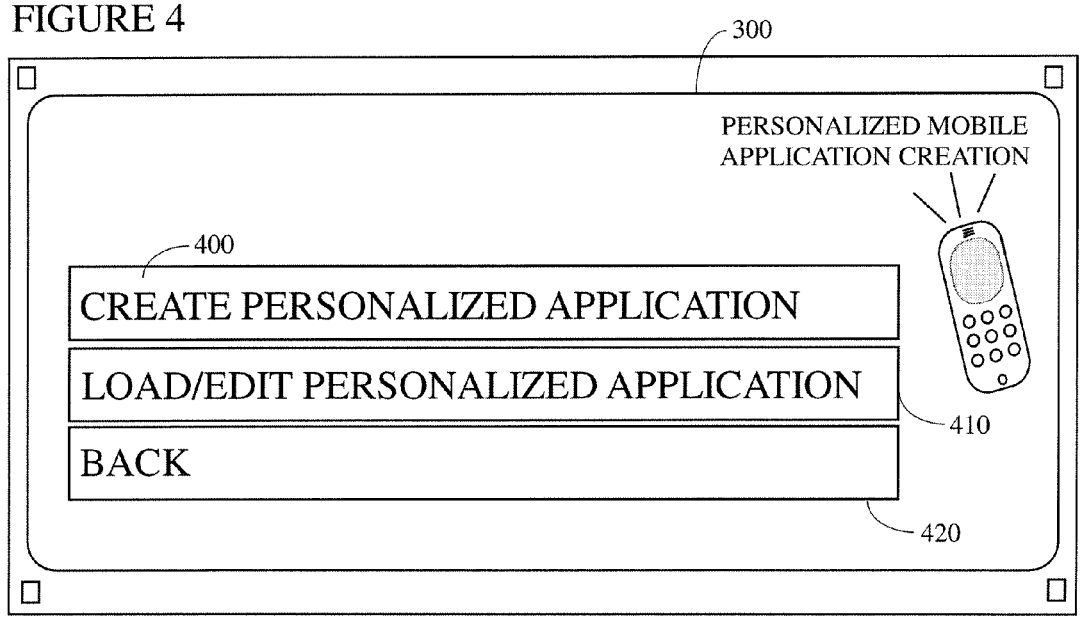
FIG. 4 depicts a second aspect of a preferred graphical user interface of the instant invention.

Turning next to FIG. 4, this figure illustrates how the screen display of FIG. 3 might appear after the user has selected the "personalized application" menu option 310. In the preferred arrangement, the user will be presented with menu options that guide him or her through the process of assembling such an application. As is indicated in this figure, at this point the user will preferably be presented with a suite of options that are associated with the application creation process. Preferably, the user will be able to start the creation process by selecting the menu option "create personalized application" 400, or he or she will be able to load and edit an already created personalized application 410 to implement changes on that particular personalized application. For example with this menu option it might be possible for the user to adapt an existing personalized application to a different mobile device. In addition to these options, the user might be able to go back to the previous step in the creation process 420.

Figure 5:
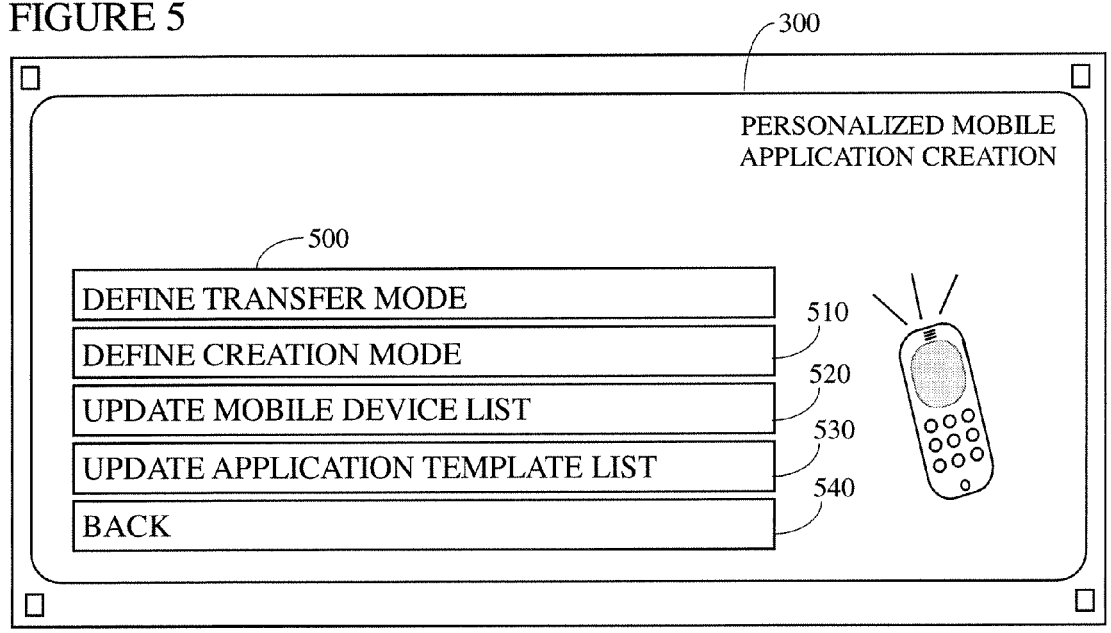
FIG. 5 illustrates a graphical user interface showing the preferred options screen of the instant invention.

Turning next to FIG. 5, this figure illustrates how the graphical user interface of the instant invention might appear after the user selects the "options" 320 (FIG. 3) menu item. The user will preferably be provided with several different options which will allow him or her to configure the settings of the instant invention. As a specific example, the user will preferably be able to choose from at least the four different options illustrated in FIG. 5. As is indicated in this figure, the user will preferably be able to at least define the transfer mode 500, define the creation mode 510, initiate an update of the mobile device list 520, or initiate an update of the application template list 530. Additionally, the user will preferably be given the option to return 540 to the previous step of the creation process.

If the transfer mode 500 option is selected, the user will preferably be allowed to select the mode by which the customized application will be transmitted from the central server or other computer to the mobile device. For example, preferably this option will make it possible for the user to override the program default (e.g., automatic selection of the transfer mode) and select an alternative mode (e.g., choosing Bluetooth to be the preferred transfer protocol).

When the creation mode 510 option is selected, the user will preferably be given the opportunity of choosing how the customized program is to be built. There are two preferred ways in which this operation will progress. In a first preferred embodiment, the user will begin by choosing the program template and thereafter will be guided in the choice of the required media files. In a second preferred embodiment, the user will begin by choosing one ore more media files and, after some or all of the files have been selected, only those templates that can accommodate the chosen files will be presented to the user for selection. Either approach will initiate the application creation process. However, if the user prefers one of the two approaches to the other, he or she will preferably be able to indicate that preference via a menu selection in the options setting screen.

According to a preferred aspect of the instant invention, the user will be able to request that the database that holds information relative to the different support mobile devices be updated periodically. That is, in the preferred embodiment the user will be able to update the mobile device list via option 520, thereby making it possible to keep the instant invention compatible with new hardware. The updated list of mobile devices could be transferred to the user in many different ways. For example, in some preferred embodiments when the user requests a download of the newest device/parameter list, that information will be transferred to a computer-readable medium and delivered to the user via surface mail. That being said, the transfer will preferably be carried out via the Internet as a file download according to methods well known to those of ordinary skill in the art. The device list update will preferably be selectable only when initiating the creation process from a computer.

On the other hand, when the instant invention is initiated from the mobile device, one or more parameters that represent the mobile device type will preferably be transferred directly to the computer that is creating the personalized application/game. The parameter might be, for example, a text string that contains the manufacturer and/or model number, or an alphanumeric (or binary, etc.) value that can be correlated to the particular device that is being used. In some preferred embodiments, rather than transmitting a manufacturer/model number the relevant parameter values themselves (e.g., screen size, bit depth, etc.) will be sent. However, for purposes of the instant disclosure transmitting the type of mobile device will be understood to also include sending the parameters themselves. Of course, in the preferred embodiment the device list will preferably be updated regularly on the computer/server that is creating the personalized application/game.

The ability to update the application template list 530 provides an additional value to the user. Via this option the user will be able to request that new application templates be downloaded if such are available. The transfer will preferably be carried out in a manner that is similar to the transfer of the mobile device list, e.g., by physical delivery of a computer-readable medium or, preferably, via the Internet. Of course, providing additional templates to the user might either be accomplished with or without charge to the user.

Figure 6:
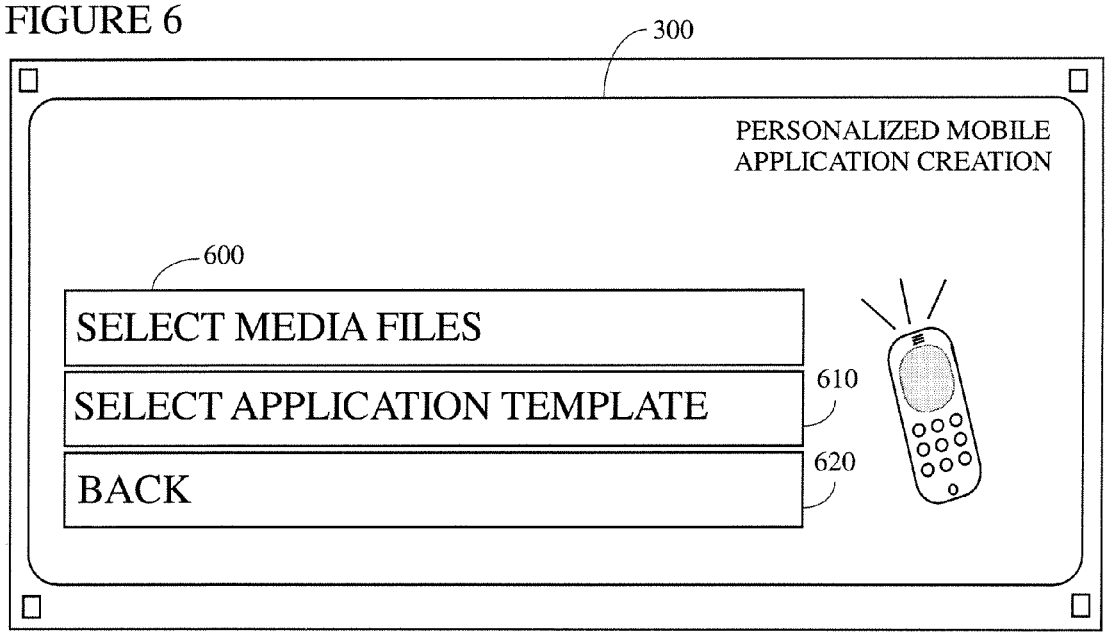
FIG. 6 depicts a third aspect of the preferred graphical user interface of the instant invention.
Figure 7:
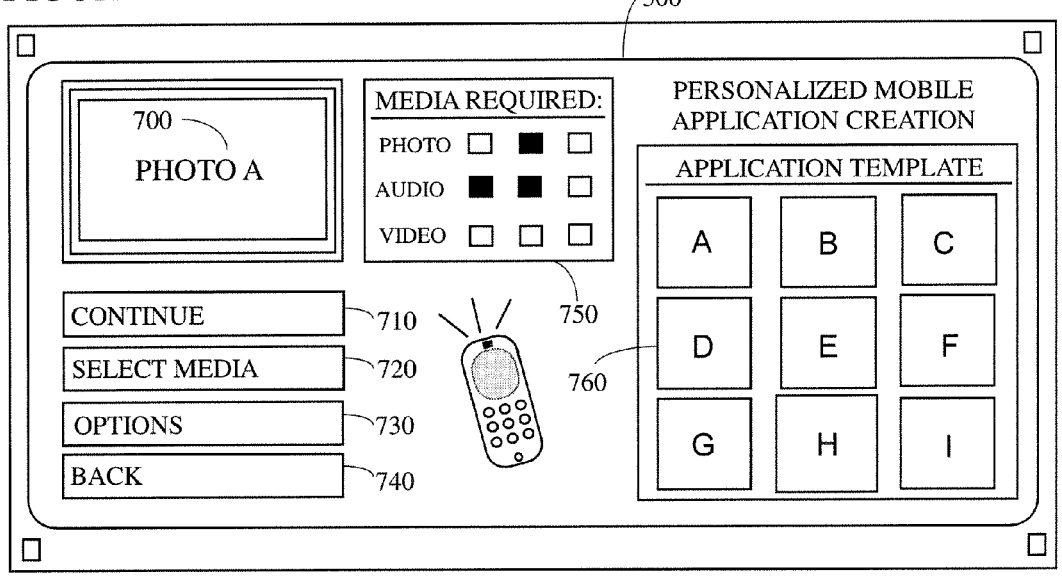
FIG. 7 depicts a preferred graphical user interface of the instant invention displaying the specific application creation screen.

Now turning to FIG. 6, this figure illustrates how the screen might appear after the user has selected the "create personalized application" menu option 400 illustrated in FIG. 4. As is indicated in FIG. 6, the user will preferably be given the option of selecting either of the two previously mentioned approaches to start the creation process. Note that in those circumstances where the user has previously defined a preferred creation mode in the options menu, the user will preferably not be presented with that screen, instead the instant invention will automatically switch to the next step of the instant invention displayed in FIG. 7. However, and as is generally indicated in FIG. 6, the user will preferably be given a choice between either beginning the instant process by choosing one or more media files 600 or by selecting the application templates 610. Additionally, he or she might choose to go back to the previous step of the instant invention 620. FIG. 7 illustrates a preferred graphical user interface through which the user will be able to initiate the creation of a personalized application. The user will preferably be presented with a section of the screen that illustrates the available application templates 760. The templates in this list correspond to the application templates that are available on the computer of the user. Additionally, and in some preferred embodiments, some of the templates will be indicated to be "extra charge" items which must be purchased prior to their use. The selection and display of these purchasable application templates will preferably be accomplished via an Internet connection.

From the menu of FIG. 7, the user will preferably be allowed to select an application template and the instant invention will preferably display the required media items for each such template graphically in a section 750 of the graphical user interface. By way of example, the media items that will preferably be usable by the user will be photo images, audio files, and/or video files. As has been discussed previously, each application template will typically require a predetermined number of media items of a given type, available items of the given type preferably being illustrated graphically 750 as shown in FIG. 7. Of course, a simple display of file names/number might be utilized instead of the preferred graphic/iconic representation.

The graphical user interface will preferably additionally provide a preview section 700, wherein the previously selected media files can be previewed. Additionally, the user will preferably also be provided with menu options that initiate the application creation process 710. Preferably, this menu item will only be selectable after the user has selected the requisite number of media files. In another embodiment it might also be possible for the user to initiate the next step of the instant invention by selecting the "continue" menu setting, even in those instances where he or she has not added the required number of media files. In that case, in one preferred embodiment the instant invention will automatically and randomly select the additional required media files from a media library that has been provided by the program developer.

Another preferred menu item is one that will allow the user to add media files 720 to satisfy the requirements of each of the application templates.

Additionally, the user will preferably be allowed to specify various operating parameters 730 related to the graphical user interface. For example, according to one preferred embodiment the user will be allowed to switch the media file display between a graphical display and a numerical display. Additionally, the user will preferably be able to go back 740 to the previous step of the instant invention.

Figure 8:
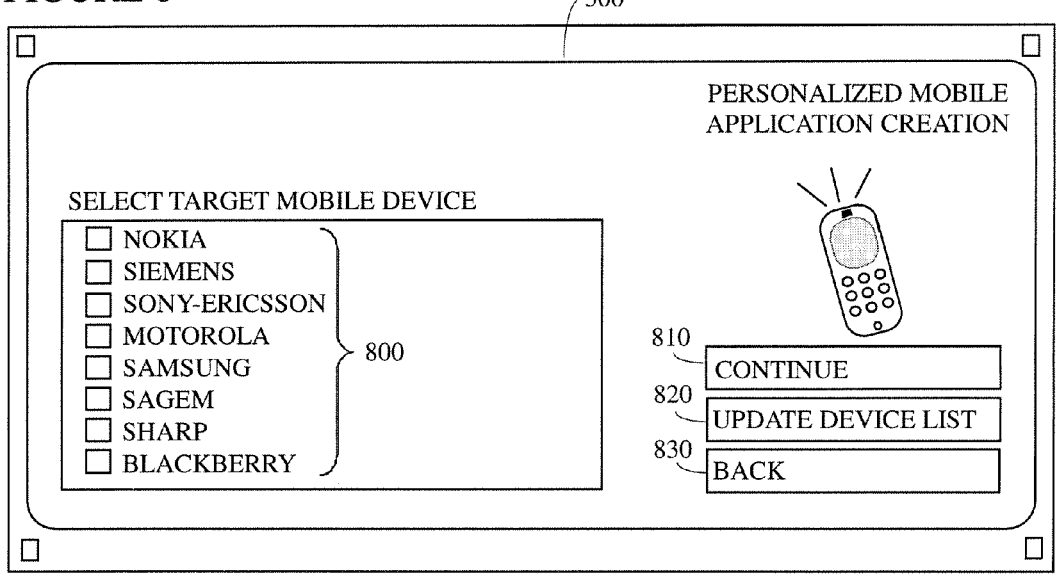
FIG. 8 illustrates a preferred aspect of the graphical user interface of the instant invention showing the mobile device selection screen.

Now turning to FIG. 8, which illustrates a next preferred step in the process of the instant invention that will preferably occur after the user has selected the media elements required by the selected application template. In this step, the user will be presented with a list of allowed mobile devices 800 and asked to select a target mobile device from among them. After the user has made a selection, he or she will preferably be allowed to continue the process of the instant invention by selecting "continue" 810 from the provided menu. If the user is unable to find the desired target mobile device within the target mobile device list he or she will preferably be able to initiate an update of the device list 820. Additionally, in some preferred embodiments the user will be allowed to go back 830 a step in the process of the instant invention, to for example exchange a specific added photo or to remove an added video file. In one preferred embodiment where the user initiates the creation process from the mobile device, the user will not be presented with such a selection screen, because the type of the mobile device will default to the hardware from which the request is initiated. In this case, technical information related to its hardware and software capabilities should be readily obtainable by simply querying the device via software. The information obtained in this fashion will then be transmitted to the computer that is creating the desired program/application after the user completes the selection of a program template and one or more media files.

Figure 9:
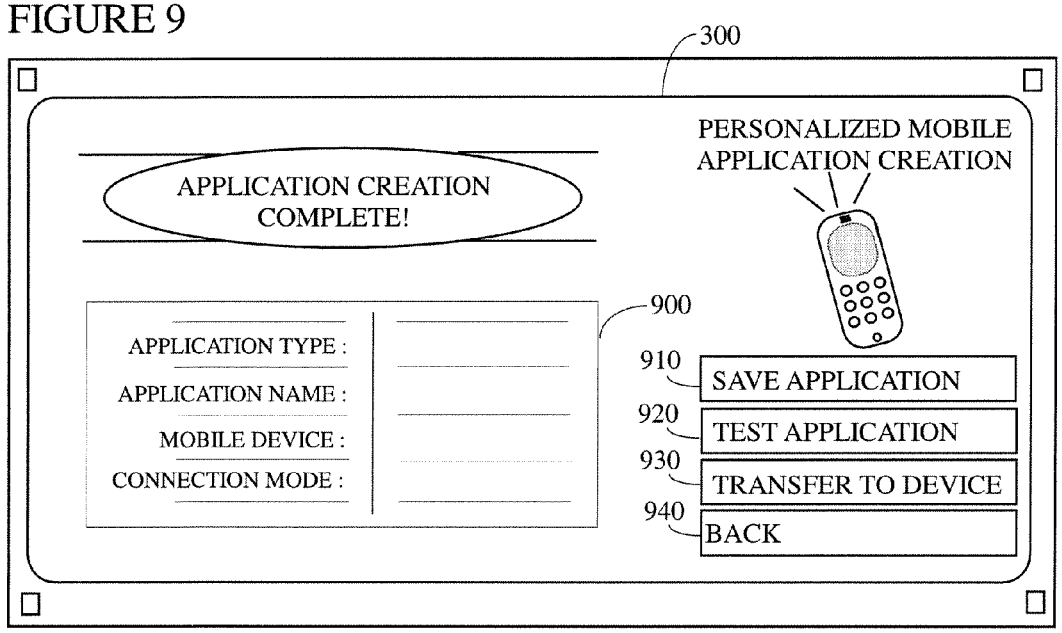
FIG. 9 depicts a preferred graphical user interface of the instant invention as it might appear after completion of the creation of a user-customized application.

FIG. 9 illustrates a last preferred operating sequence of the instant invention. This step informs the user that the creation of the personalized application has been completed. Additionally the user will preferably be presented with a display 900 that informs the user concerning the specifics of his or her personalized application, e.g., this display might contain information such as the type and name of the resulting personalized application, the selected desired target mobile device, the connection mode to the target mobile device, etc.

At this point the user will preferably be presented with menu options from which he or she can choose how to proceed with the personalized application. The user will preferably be given the option to store 910 the personalized application on a storage device, for example hard disk, or other computer readable medium. Preferably, the default storage location for the customized application will be the local hard disk of the host machine.

Another preferred option would be to allow the user to test 920 the resulting personalized application on the host computer, in which case the instant invention will preferably enter an emulation mode in which the target mobile device is emulated. The emulation mode will allow the user to test the resulting application in order to, for example, see if the selected media files are suitable for that particular type of application template.

If the user is satisfied with the resulting personalized application he can choose to transfer 930 the created application to the desired target mobile device. On the other hand, if the user is not satisfied with the selected media files or if he or she is not satisfied with the application template, it will preferably be possible to go back 940 through the creation steps and choose a new application template and/or media item (s).

Upon receipt of an instruction from the user, the creation request will be transferred to the host computer/server in which the application will be assembled. Additionally, the selected media files and the selected program template number/type, as well as information pertaining to the mobile device manufacturer and model number will be transmitted to the creation computer/server. The information that is transmitted to the remote CPU will be used to construct an application that contains media items specified by the user. The resulting application will then be transmitted to the mobile communications device for which it was designed, where it can be tested by the user to see if it meets the user's expectations.

Figure 10:
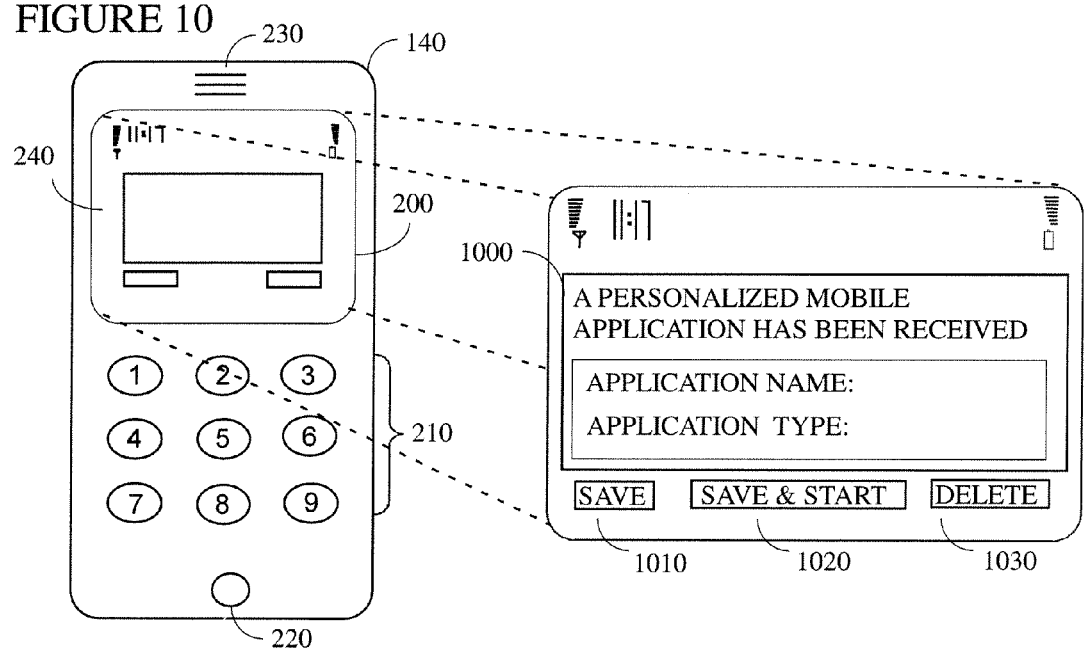
FIG. 10 depicts a graphical user interface of a cell phone using the instant invention as it might appear after reception of a customized application.

Turning next to FIG. 10, this figure illustrates a possible representation of the message that will be presented to a user of the target mobile device after the user has elected to transfer the created personalized application thereto.

As is indicated in this figure, the user will preferably be informed that a new application has been received on the mobile device 1000 and, additionally he or she will preferably be informed concerning the type and the name of the personalized application. The user will preferably then be presented with various options related to the reception of the personalized application. For example, the user will preferably be able to store 1010 the personalized application for later use. Alternatively, he or she will preferably be given the option of storing the personalized application and subsequently executing it 1020. With selection of option 1020, the personalized application will be stored in the memory of the mobile device (to include storage in an attached memory card, etc.). Additionally, the user will preferably be allowed to delete 1030 the personalized application without running it if that is desired.

Figure 11A:
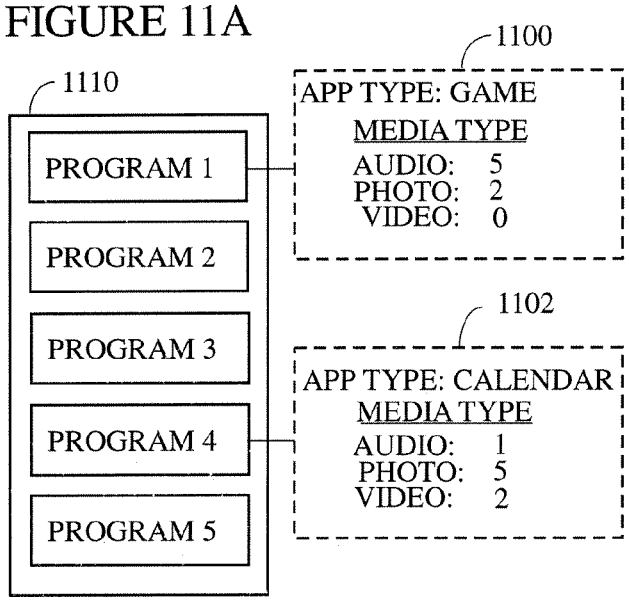
FIGS. 11A-C illustrates a preferred relationship between the program templates and their requirements, and the respective selection of appropriate media files from a media database.
Figure 11B:
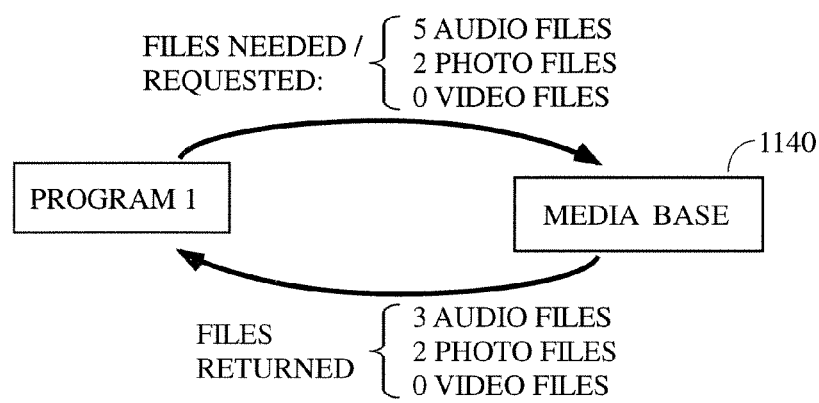
Figure 11C:
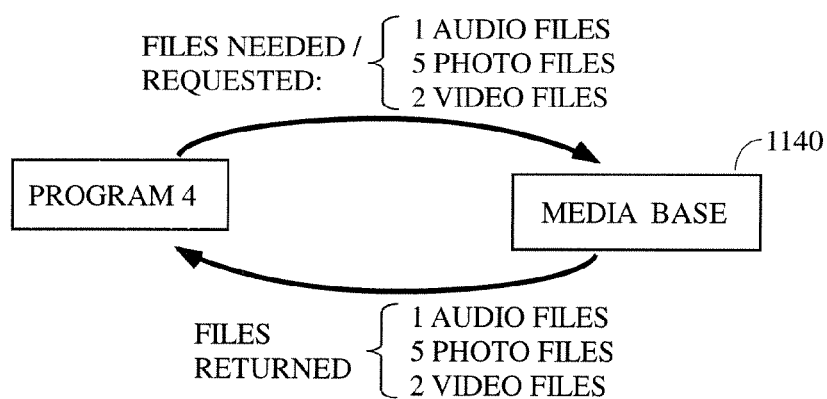

FIGS. 11A-C illustrates in greater detail the connection between the application templates and the media database which will preferably be provided to a user of the instant invention. Additionally these figures illustrate a preferred internal data structure of the application templates. In FIG. 11A, the available application templates 1110 for five different computer programs are represented by the designations "Program 1" through "Program 5", respectively. Additionally, exemplary associated media requirements 1100 and 1102 have been indicated for Programs 1 and 4. As is generally indicated in this figure, the application template 1100 for Program 1 requires 5 audio files, 2 digital still photo files (e.g., .gif or JPEG/.jpg files) and no video files. According to the preferred method of the instant invention, if a user selects the Program 1 application template, the instant invention will preferably access a database to determine the requirements for that template and will use that information during the creation process, and, further, will request 5 audio files from a media base 1140. Note that the term "media base" is not intended to be interpreted as requiring that element 1140 have any particular structure or organization or to be physically located in any particular place(s). This designation is used to describe any file type(s)/location(s) where the user might have stored media files that are suitable for use with the instant invention.

Suppose, for purposes of illustration, the user has provided only 3 of the 5 required audio files said to be needed for Program 1 (e.g., FIG. 11B). In that case, the instant invention will preferably ask the user to supply the remaining audio files before proceeding to the next step. In the case of Program 4, the application template requires 1 audio file, 5 photo files, and 2 video files. The instant invention will preferably use that information during interactions with the user to inform him or her of the requirements for that selected application template and, in case of the requirements for application template 4 1102 as is illustrated in FIG. 11C, the user has supplied the requisite number of media files required by that template, thereby enabling the instant invention to go to the next step, the selection of the desired target mobile device.

Figure 12:
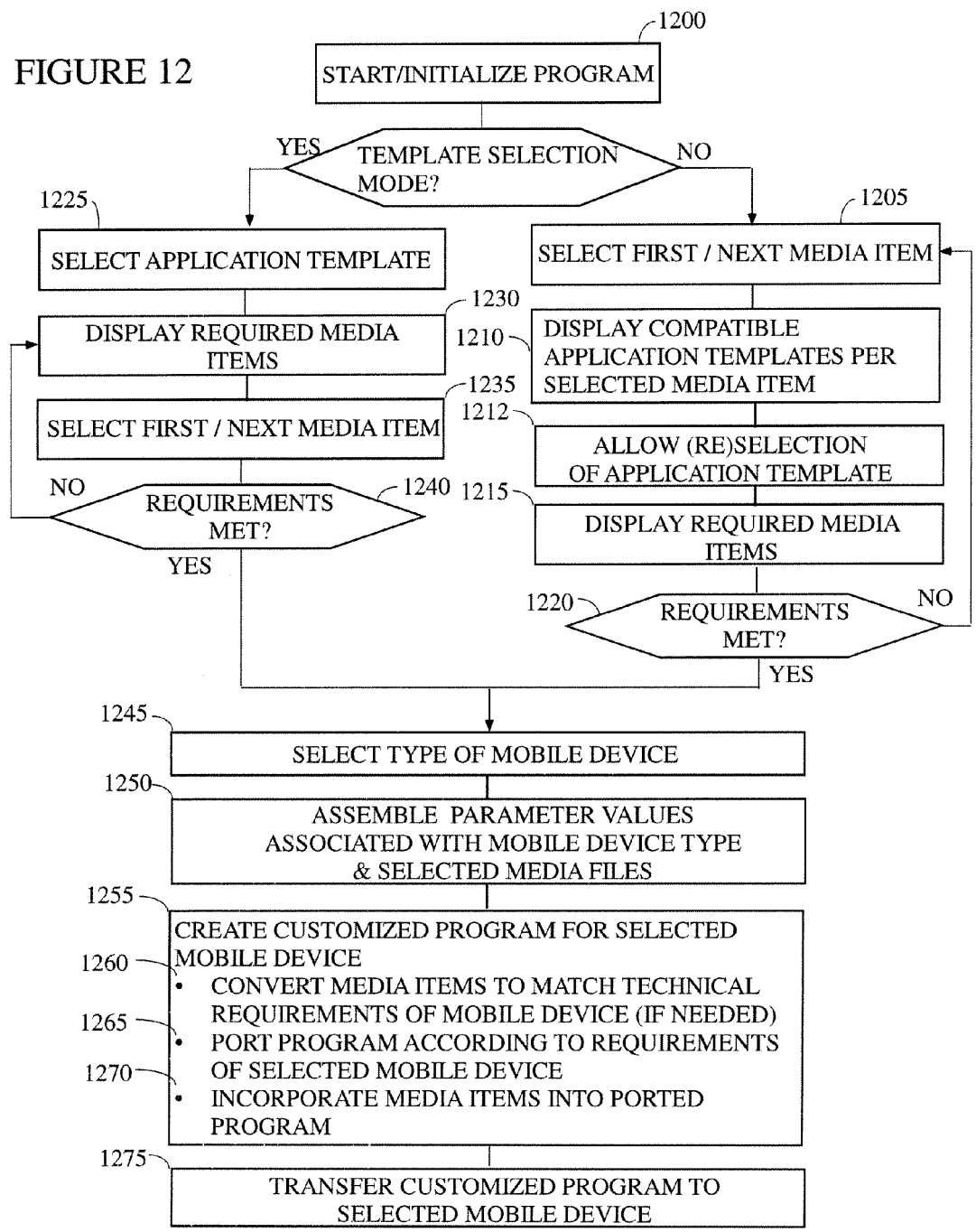
FIG. 12 contains a flowchart that illustrates some preferred steps of the instant invention in the embodiment wherein the media files are already present on the server.

FIG. 12 illustrates a preferred workflow of the instant invention. As a first preferred step 1200, the program will be activated and initialized according to methods well known to those of ordinary skill in the art. As a next preferred step, a determination will be made as to which mode the user wishes to utilize in designing the customized application. If the user wants to start the application creation process by selecting a media item (e.g., selecting a media file such as a still photo that was shot during a vacation), the instant method will take the right hand branch in FIG. 12. This branch will preferably be invoked when the user begins the application specification process by selecting a media item 1205, which might be an audio file, a video file, a digital image, a text message, etc. The instant invention will preferably automatically display a list of application templates that are compatible with the previously selected item (step 1210). The user may make a template selection at step 1212 or, alternatively, continue choosing media items without selecting a template. Note that the list of compatible templates might be modified depending on subsequent media item selections. In the preferred embodiment, the compatible application templates will be re-evaluated after each media item selection (step 1205) and the user will preferably be presented with a shrinking list of application templates (step 1210) as more media items are added. After the user selects another item, if there is more than one compatible application template the user will be given an opportunity to choose one from the list (step 1212). Otherwise, the process continues until the user has selected all of the media items that he or she wishes to use in customizing an application program. At that point, if there are more than one compatible templates remaining, the user will be asked to choose one of them.

As a next preferred step, the instant invention will preferably compare the list of selected media files with the inventory of media files required for use with the previously chosen application template. If the requirements of the selected application template are not met, the instant invention will preferably display 1215 the type and number of media files that remain to be selected. In the case that the requirements 1220 are met, the instant invention proceeds to the next step—the specification of the target mobile device (step 1245).

If, on the other hand, at the beginning of the process the user elects to begin by selecting an application template (step 1225), the preferred method will take the left branch in FIG. 12. The user will preferably next be presented with a list of available application templates and asked to choose one of them (step 1225). The templates will preferably be presented to the user in a selection screen wherein features of each associated application will be displayed in the form of a small video or a thumbnail that illustrates the general features of the selected application template.

As a next preferred step, the instant invention will display information about the media items that are required for the selected template (step 1230), wherein the information that is provided will preferably be taken from the data that is contained in the application template (see, e.g., FIG. 11A). As a next preferred step, the user will preferably select media item(s) 1235 sufficient to meet the requirements of the currently selected application template. Preferably, the selection process of the instant invention will continually update the list of the required media files to reflect the most recent selection. In the preferred arrangement, the user will be required to add media files until the requirements 1240 of the selected application template are met. If the requirements are not met the instant invention preferably switches back to the display of the required media files to inform the user of the fact that there are still specific media files missing. In another preferred embodiment the user will be able to exit from the loop 1230-1240 before the requisite number of media items have been selected. In this case, the instant invention will preferably automatically add media items from a media database provided by the software author to complete the requirements of the selected template.

Once the user has added enough media files to meet the requirements of the selected application template 1240, the instant invention will preferably proceed to the next step, the selection of the target mobile device 1245. In conjunction with this step, the user will preferably be presented with a list of mobile devices. As has been described previously, if the user's target device is not currently in the list, the user will preferably be able to initiate an update of that list.

The next preferred step is a data gathering step 1250, wherein the instant invention obtains the technical parameters of the target mobile device and the format data of the selected media files. The technical parameters of the target mobile device will typically include information such as the types of media files the device can process, the bit rates, file sizes, bit depth (i.e., number of bits per pixel in the display), and resolutions the device is capable of displaying, playing, etc. Additionally, the instant invention preferably also obtains information concerning the operating system/operating environment of the selected device. Further, the transfer modes that the selected mobile device supports will preferably also be determined. Still further, the instant program will preferably assemble information regarding the resolution, bit rate, file type, bit depth, etc., of the media items that have been selected for incorporation into a customized application.

As a next preferred step, the instant invention will begin the process of creating the customized/personalized application for the selected mobile device 1255. Preferably this step will include two steps that will be carried out without any visual notification to the user: converting the selected media items into a format that matches the capabilities of the selected device (step 1260) and porting the application associated with the selected template to the selected device (step 1265).

First with respect to step 1260, the instant invention will preferably convert the media items to match the technical capabilities/limitations of the target mobile device. To achieve this goal the instant invention will preferably use the previously obtained information about the technical capabilities of the target mobile device in order to choose a resolution, bit rate, etc., that will be playable thereon. Where there are multiple usable resolutions, bit rates, etc., the instant invention will preferably choose the most demanding (e.g., highest) value that is usable by the target device. Of course, other variations are certainly possible.

After the media have been converted to a compatible format, the instant invention will preferably proceed by creating code that is executable on the target device (step 1265). In some embodiments, the application program will be maintained in source code form and this step will be accomplished through the use of a cross compiler or a similar software tool. However, in the preferred embodiment the templates will be stand alone programs that only lack the necessary media files: preferably they will not have been customized to run in any particular environment. Thus, the process of creating the target application will not be very time consuming.

In conjunction with step 1265, the instant invention will incorporate the selected media items into the ported program (step 1270). Note that this incorporation might be of two forms. In a first preferred embodiment, the media file will be physically added to the program so that the resulting program consists of a single file. On the other hand, in other preferred embodiments a pointer will be added to the program that indicates a file location (e.g., file name) of a media item. Then, at the appropriate point in the program, the media item will be read from local storage using the pointer provided and thereafter performed on the mobile communications device. Note that in this embodiment the "program" might actually consist of multiple files, some of which are media files and at least one of which is an executable (or interpretable program, etc.) that is suitable to be run on the target device.

As a next preferred step the instant invention will transfer the recently created customized application to the selected mobile device, preferably using either a wireless (e.g., Bluetooth, infrared, etc.) or a wired protocol (step 1275). Preferably, the selection of the transfer mode will be carried out automatically without a need to obtain input from the user. In some scenarios, the user will be able to define the connection type via a program option. Of course, and as has been discussed previously, in some instances the user will be able to view the resulting application on an emulator that runs on the host machine before transferring it to the selected device. Of course, if the user is satisfied he or she might initiate the transfer to the target mobile device and, if not, he or she might be allowed to return to a previous step in the process.

Figure 13:
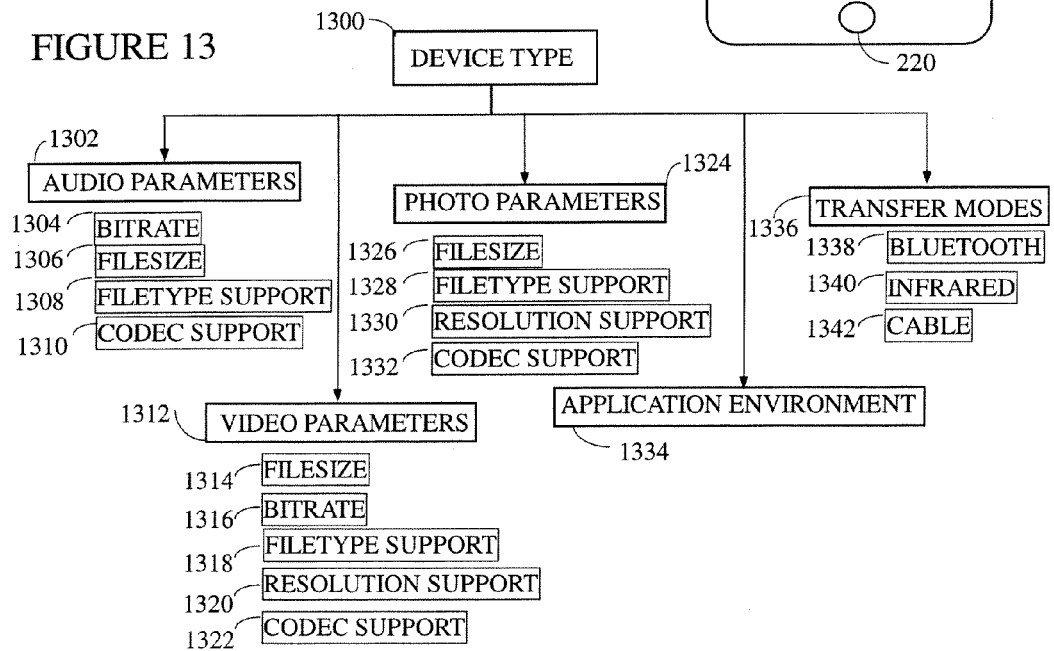
FIG. 13 contains a schematic illustration of the sorts of parameters that might be determined illustrates a preferred specific structure of the mobile device templates.

Turning to FIG. 13, this figure illustrates a preferred data structure suitable for storing the audio, video, etc., parameter settings of different mobile devices. In the preferred embodiment, there will be five sorts of parameters, the value of which define capabilities of the target mobile device 1300. As is indicated in this figure, the first three parameter sets describe the technical capabilities of the target device in processing audio 1302, video 1312 and photo files 1324, wherein each setting for a media type additionally contains information about the ability of the target device to process the subject files. For example the audio section preferably contains information about the bit rate 1304, and file size 1306 that this mobile device supports. Additionally the data structure 1300 preferably contains information about whether or not this device can support specific file types 1308 and codec support 1310. The information stored for a device's photo and video capabilities is preferably virtually the same, and includes information such as file size limitations 1314 and 1326, supported file types 1318 and 1328, supported resolutions 1320 and 1330 and supported codecs 1322 and 1332. The bit rate parameter 1316 is typically associated only with video (as opposed to audio) files.

Additionally, in the preferred embodiment there will be information about the application execution environment 1334 (e.g., the phone operating system which might be Windows Mobile®, Palm®, Symbian®, etc.) and the supported transfer modes 1336 that are available on the selected mobile device (e.g., Bluetooth 1338, infrared 1340, and data cable 1342).

Figure 14:
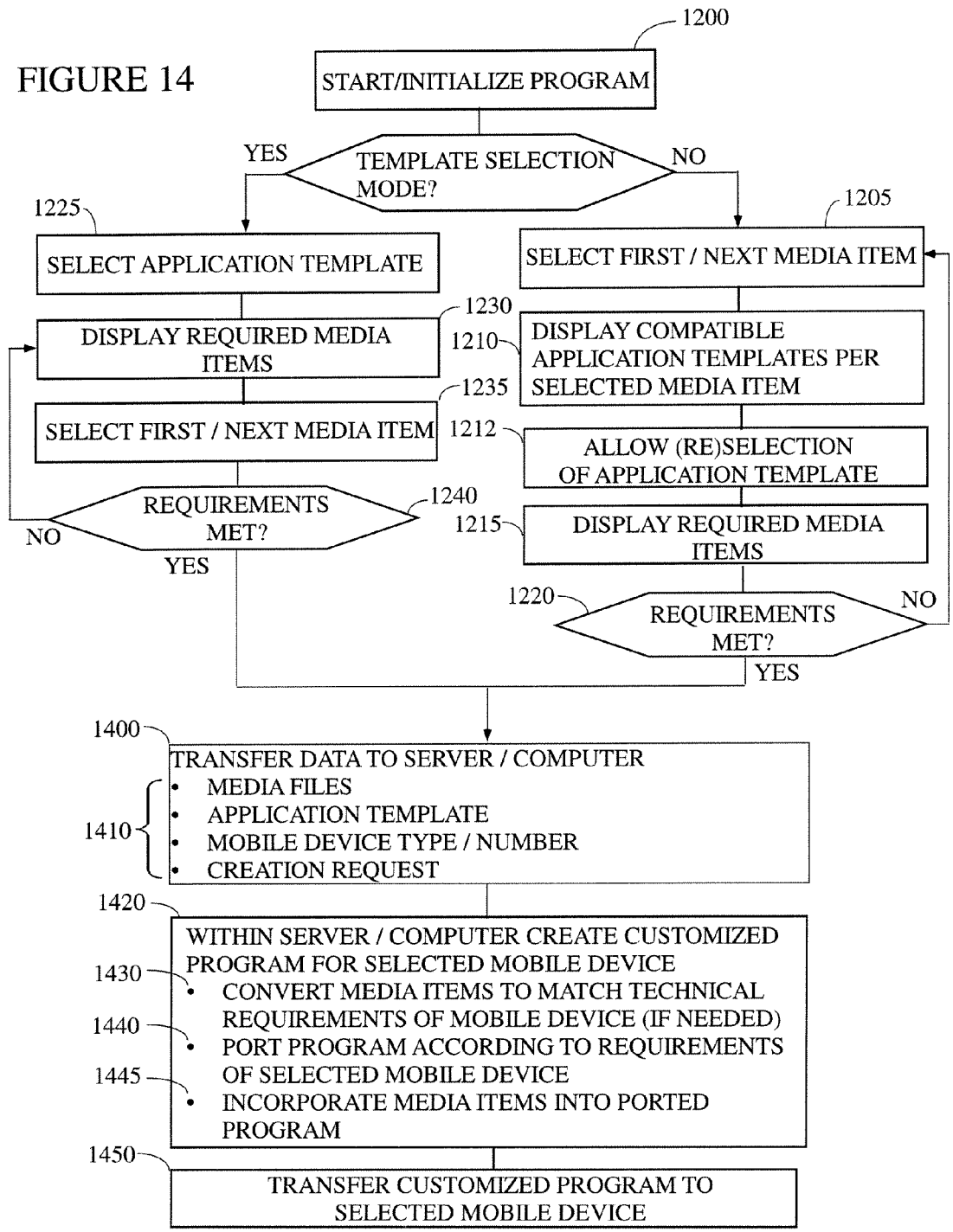
FIG. 14 contains a flowchart that illustrates some preferred steps in an embodiment where the media files are located initially on the mobile communications device.

Finally, turning to FIG. 14, this figure illustrates the workflow of the instant invention when the initiating device is the mobile device of the user. The initial steps are preferably similar to those illustrated in FIG. 12 and, thus, will not be discussed here. The steps that illustrate the differences between these two approaches begin with step 1400, i.e., at the point where the user has selected the desired application template and the necessary media files. After the completion of the data selection/collection step, the user transfers the data to the server/computer that will be responsible for creating the application, wherein the data will preferably be comprised of the application request, the type and number of the mobile device, the name of the application template and the selected media files 1410. The creation computer could be a single personal computer to which the data is transferred via Bluetooth, infrared or data cable or it could be a server connected to the Internet to which the user transfers the data.

In a next preferred step the creation computer initiates the creation of the personalized application 1420 and as part of that creation process the selected media items will be converted 1430 according to the technical capabilities of the mobile device, wherein the creation computer acquired the data regarding the technical capabilities from an internal mobile device list containing the technical capabilities. Additionally the application program will be created according to the capabilities of the mobile device incorporating the converted media files 1440. In a next preferred step the creation application program will be transferred back 1450 to the initiating mobile device by using the transmitted number of the mobile device.

CONCLUSIONS

Of course, many modifications and extensions could be made to the instant invention by those of ordinary skill in the art. For example in one preferred embodiment a user will be allowed to modify the underlying application template, as opposed to just providing media files compatible with existing templates.

Additionally in another preferred embodiment the host computer will automatically detect devices that are within it's wireless range (or physically connected to it). In this instance, the task of the user will be simplified (e.g., the user will not have to specify the target device but would only need to select same from a list of devices within sensing range of the host computer).

Further, although the preferred mobile device for use with the instant invention is a cell phone, it should be understood by those of ordinary skill in the art that the steps utilized herein could also be used to prepare programs for execution on other mobile devices such as handheld computers (e.g., PDAs running the Palm® or Windows Mobile® operating system, MP3 players, etc.). In such a case, rather than the communications between the handheld and the desktop/laptop computer being transmitted via telephone signals, wireless technologies such as Bluetooth, IR, Wifi (e.g., IEEE 802.11 b/g), etc.

Still further, those of ordinary skill in the art will recognize that the term "database" should be broadly construed to include any sort of computer-readable electronic file or files containing information, whether that file takes the form of a convention database (e.g., a hierarchical, relational, etc., database) or a flat file. Whether the database file is stored locally with respect to the user or is remotely accessed via a database is immaterial to the operation of the instant invention.

Additionally, note that the terms "perform" and "performance" when used herein to describe media files that are incorporated into the customized program, should be broadly construed to mean displaying that file (if the media file is a digital image or a video file) or playing that file (if the media file is an audio file, a MIDI file, or a video file), etc., on the target mobile communications device which might be a cell phone, PDA, MP3 player, etc.

Similarly, when a program is said to be "executed" on a cell phone or other mobile device, that term should be understood to include the visual display of user-selected graphical material on the device's graphics-capable screen and/or the audible performance of the selected audio material through the device's speaker, as appropriate.

It also should be noted and remembered that when the phrase "parameter value" is used herein, that phrase should be broadly understood to include numerical values, alphanumerical values, special characters, binary values, any combination of the foregoing, etc., as might be appropriate based on the context in which the phrase is used. Further, the singular "parameter" value" should further be understood to include the plural "parameter values" when appropriate (e.g. the parameter "screen size" would typically include both a horizontal and a vertical dimension, likely measured in pixels.)

Finally, it should be noted and remembered that for purposes of the instant specification and the claims that follow, the term "program" should be broadly interpreted to include every sort of program that might be executed on a mobile device including, without limitation, games, productivity programs, organization programs (contact information, etc.), communications programs, utilities, databases, screen savers, etc.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those skilled in the art, without departing from the spirit of the inventive concept the scope of which is to be determined by the following claims.

What is claimed is:

1. A method of preparing a customized application for use on a mobile communications device, wherein said mobile communications device has a display integral thereto, and wherein at least one media file is stored within said mobile communications device, comprising the steps of:
   a. using said mobile communications device to select an application template from among at least one predetermined application templates, each of said at least one predetermined application templates having a computer program associated therewith, each of said associated computer programs being suitable for execution on said mobile communications device;
   b. selecting within said mobile communications device at least one of said at least one stored media files;
   c. transmitting each of said selected at least one media files to a remote server;
   d. transmitting an indication of said selected application template to said remote server;
   e. transmitting a value representative of a type of said mobile communications device to said remote server;
   f. using at least said transmitted value representative of said mobile communication device to determine whether each of said transmitted media files can be performed on said mobile communications device;
   g. identifying an application program corresponding to said transmitted indication of said application template;
   h. creating said customized application from said identified application program by incorporating each of said at least one transmitted media files into said identified application program, wherein for each of said transmitted media files,
      (h1) if said transmitted media file can be performed on said mobile communications device, incorporating said media file into said identified application program, and,
      (h2) if said transmitted media file cannot be performed on said mobile communications device,
         (i) using at least said transmitted value representative of said type of said mobile communications device to modify said transmitted media file to allow it to be performed on said mobile communications device, thereby creating a modified media file, and,
         (ii) incorporating said modified media file into said identified application program;
   i. transmitting said customized application to said selected mobile device; and,
   j. executing said customized application within said selected mobile device thereby at least performing said at least one selected media files on said mobile communications device.

2. A method according to claim 1, wherein each of at least one said stored media files is selected from a group consisting of an audio file, a MP3 file, a video file, an MPEG file, a MIDI file, a multimedia file, a JPEG file, and a digital image.

3. A method according to claim 1, wherein said customized application is selected from a group consisting of a game program, a calendar program, and, an address book program.

4. A method according to claim 1, wherein said mobile communications device is selected from a group consisting of a cellular telephone, a PDA, and an MP3 player.

5. A method of creating a customized application for execution on a cell phone, wherein is provided at least one media file resident in said cell phone, comprising the steps of:
   a. using said cell phone device to select an application template from among at least one application templates, wherein said selected application template corresponds to an application program suitable for execution on said cell phone and suitable for incorporating one or more of said at least one media files therein;
   b. selecting from within said cell phone at least one of said at least one media files, each of said selected media files being suitable for incorporation into said application program;
   c. transmitting each of said selected at least one media files from said cell phone to a remote server;
   d. transmitting a value representative of said selected application template to said remote server;
   e. transmitting a value representative of a type of said cell phone to said remote server;
   f. creating said customized application from said application program by incorporating at least one of said transmitted media files therein, wherein for each of said at least one transmitted media files incorporated into said application program,
      (f1) using at least said value representative of said type of said cell phone to determine whether said transmitted media file can be performed on said cell phone, (f2) if said transmitted media file can be performed on said cell phone, incorporating said transmitted media file into said application program, and, (f3) if said transmitted media file cannot be performed on said cell phone, (i) using at least said transmitted value representative of said type of said mobile communications device to modify said transmitted media file to allow it to be performed on said cell phone, thereby creating a modified media file, and, (ii) incorporating said modified media file into said application program;

g. transmitting said customized application to said cell phone; and, h. executing said customized application within said cell phone.

6. A method according to claim 5, wherein step (f1) comprises the step of:

(i) reading from a database at least one technical parameter value of said cell phone based at least on said transmitted value representative of said type of cell phone, and, (ii) using at least one of said at least one technical parameter values to determine whether said transmitted media file can be performed on said cell phone.

7. A method according to claim 5, wherein said media file is selected from a group consisting of an audio file, an MP3 file, a video file, an MPEG file, a MIDI file, a multimedia file, and a digital image, a JPEG file.

8. A method according to claim 5, wherein said application program is selected from a group consisting of a game program, a calendar program, and, an address book program.

9. A method according to claim 6, wherein said cell phone has a display integral thereto, and wherein each of said at least one technical parameter values are selected from a group consisting of a horizontal size of said cell phone display in pixels, a vertical size of said cell phone display in pixels, a cell phone display bit depth, a maximum display bit rate, an amount of memory in said cell phone, and a processor speed of said cell phone.

\* \* \* \* \*